A. Good, Jr.,
Shaft Coupling.
No. 99,997. Patented Feb. 15, 1870.

Witnesses:
D. Smith
P. A. Devine

Adam Good, Jr.
By Opperman & Johnson
Attorneys.

N. PETERS, PHOTO-LITHOGRAPHER, WASHINGTON, D. C.

United States Patent Office.

ADAM GOOD, JR., OF TITUSVILLE, PENNSYLVANIA.

Letters Patent No. 99,997, dated February 15, 1870.

IMPROVEMENT IN SUCKER-ROD COUPLINGS FOR OIL WELLS.

The Schedule referred to in these Letters Patent and making part of the same

*To all whom it may concern:*

Be it known that I, ADAM GOOD, Jr., of Titusville, in the county of Bradford, and State of Pennsylvania, have invented certain new and useful Improvements in Sucker-Rod Joints for Tubing and other purposes; and I do hereby declare that the following is a full, clear, and exact description of the same, reference being had to the accompanying drawings thereof, which make part of the same, and in which—

Figure 1:
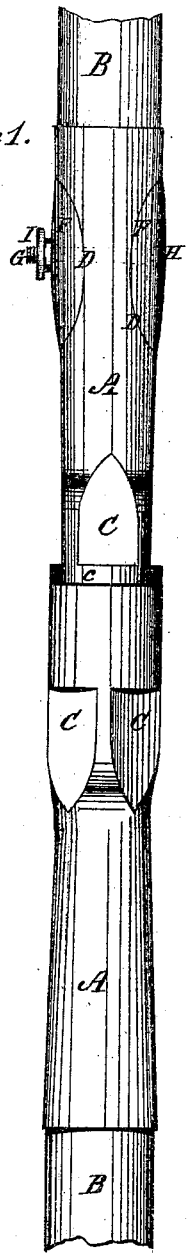
Figure 1 represents an elevation of a joint for tubing, embracing my improvements.
Figure 3:
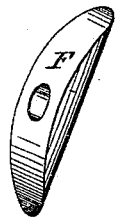
Figure 3 represents a perspective view of one of the flush joint jaws.
Figure 2:
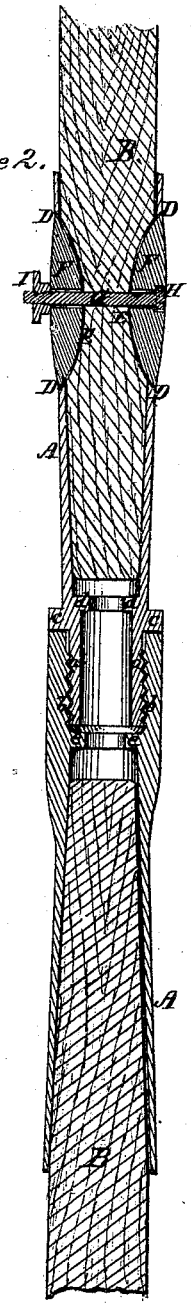
Figure 2 represents a vertical longitudinal section of the same.

My invention relates to a device for connecting the sections of the rod which operates the sucker of oil wells, and consists in forming the joint by means of clamping jaws fitted into the outer sides of the joint-pin, so as to have a bearing not only within the pin, but into the sides of the wooden connecting rod secured therein, in such a manner as to form a flush joint, and locking these clamping plates on their seats by means of a screw-bolt passing through them and the said wooden connecting rod.

In the accompanying drawings—

A represents the joint-pins by which the wooden sections B, which constitute the sucker-rod, are united.

These pins A are provided with a male and female screw-thread, *a b*, by which one is screwed within the other; and they are made square, as shown at C, near their junction, for the purpose of affording a better hold to screw them tightly together.

Into the open ends of these pins the wooden connecting rods are fitted and driven tightly, and in order to render their connection perfectly secure therein, the opposite side of each pin, near its upper end, is cut out or hollowed, so as to form a seat, D.

The depth of this cut is sufficient to extend, also, into the sides of the wooden connecting rod within the pin, so that the seat in the latter will be coincident with the seat E in the rod.

Upon these seats D E, I secure two clamping jaws, F, the inner sides of which are the counterpart of the seats in the pin and rod, while their outer sides are coincident with the circumference of the pin A, and, therefore, perfectly flush therewith.

The jaws F, thus arranged upon their seats D E, bear equally upon the exterior of the pin and the exterior of the rod within it, and are clamped in this position by means of a clamp-screw, G, passing through the jaws and the connecting rod.

The head H of this clamp-screw is countersunk, while its opposite end is threaded, and projects only far enough beyond the jaw to receive a lock-nut, I, thereupon, from which it will be seen that the clamp-screw G not only serves to lock the jaws together, but serves as a rivet to the rod, as heretofore.

These clamping jaws F are of a length equal to about twice their width, and, in the example represented, are convex on their inner sides, in the direction of their length, while their transverse section at any point will present a perfectly straight line, thus offering an equal bearing to the pin and rod throughout their length.

These jaws being thus countersunk and coincident with the circle of the pin, offer no projection whatever to the surface thereof, which in this respect is of great advantage, as the annular sleeves or shoulders heretofore used increase the diameter of the pin, and thus diminish the space between it and the interior of the tubing, which is a source of serious trouble to oil operators, as from this cause the upward flow of the oil is retarded, and has been found to be the reason of the bursting of the tubing by the greatly-increased pressure and friction at those points. The flush joint, therefore, offers the greatest facility for the passage of the oil, and leaves the area of the tube undiminished.

Moreover, it relieves not only the pin, but the wooden connecting rod of all strain, as separate and distinct parts, and instead of confining the strain to the joint transversely, transfers it to the parts in the direction of their length, as though there were no joint, but a continuous piece.

I have described and represented one form of the flush joint jaws, as applied to one of the pins, but it is obvious that their seats may have a square bearing, or that they may be fitted in the sides of the pin in the manner of a dovetail, or have any other suitable form, without departing from the spirit of my invention. Both pins are, of course, provided with these jaws, for connecting their respective rods.

I have described the pins A as being hollow, and open at both ends. An important advantage is derived from this construction over the solid closed joint heretofore used, in the saving of one hundred pounds' weight, more or less, according to the number of joints of the sucker-rod required for the well, and, consequently, relieves the derrick and engine from corresponding strain in raising and lowering the sucker-rod. It enables me, also, to form a flush joint at the junction of the pins by a shoulder, *c*, and a screw-thread, *a*, upon the end of the upper pin, and a strengthening shoulder, *d*, on the inner side of the tube, nearly opposite the outer shoulder *c*, and a female screw-thread, *b*, is formed in the box end of the lower pin, which is also provided with an interior shoulder, *e*, and when the two are screwed together the box end will abut against the upper outer shoulder *c*, and the screw *a* of the upper pin against the lower inner shoulder e, so as to form a perfectly flush joint, while the interior shoulders brace and strengthen the ends of the pins, without any external shoulders whatever, which have been found to be a great disadvantage, as they have the effect of increasing the friction and pressure on the tubing when working, and, by compressing the fluid, have been the means of causing the tubes to burst.

While my invention is shown and described as applicable to sucker-rod joints for oil wells, it is not designed to confine its application to this particular purpose, but I propose to use it for other purposes where a flush joint may be required.

Having thus described my invention,

I claim—

1. The jaws F, constructed and arranged as described, in combination with the socket-pin A and connecting rod B, substantially as described.

2. The jaws F, countersunk in the sides of the pin and the connecting rod, so as to form a clamping joint flush with the outer sides of said pin, as herein described and shown.

3. The combination of the jaws F, the locking bolt G, the hollow pin A, and the connecting rod B, the whole constructed and applied as herein described.

4. The hollow pins A, open at both ends, for the purpose of reducing the weight of the sucker-rod, substantially as herein described.

5. The hollow pins A, provided with interior shoulders d e, for strengthening and bracing the flush joint formed as herein described and shown.

ADAM GOOD, Jr.

Witnesses:
G. W. GARDNER,
B. JUDD.